United States Patent Office 3,523,875 Patented Aug. 11, 1970

3,523,875

PROCESS FOR METAL COATING SUBSTRATE PRETREATED WITH ALKALI METAL SULFIDE AND RESULTANT PRODUCT

Alfred O. Minklei, Kenmore, N.Y., assignor to Hooker Chemical Corporation, Niagara Falls, N.Y., a corporation of New York No Drawing. Filed Mar. 15, 1967, Ser. No. 623,210
Int. Cl. C23b *5/64;* C03c *17/10;* C23c *3/02*
U.S. Cl. 204—38 16 Claims

ABSTRACT OF THE DISCLOSURE

Various substrates, including polymers that contain an aromatic nucleus, particularly phenolic resins, are plated with metals by pretreatment of the substrate surface with an alkali metal sulfide, followed by contacting the treated surface with a metal salt. The resulting treated surface is readily electroplated by conventional techniques. The metal salt treatment of the pre-treated surface can be performed by a metal salt solution in a conventional electroplating bath.

BACKGROUND OF THE INVENTION

There is a rapidly increasing demand for metal plated articles, for example, in the production of low cost plastic articles that have a simulated metal appearance. Such articles are in demand in such industries as automotive, home appliance, radio and television and for use in decorative containers and the like. Heretofore, the metal plating of materials such as plastics has required many process steps.

It is an object of this invention to provide a simple process for the metal plating of various substrates, including plastics. A further object of the invention is to provide articles having an adherent metal coating that is resistant to peeling, temperature cycling, and corrosion. Such coatings are electrically conductive whereby static charges are readily dissipated from the plastic surfaces. Such conductive surfaces are useful in printed circuits. The metal coatings further serve to protect articles, especially plastics, from abrasion, scratching and marring, reduce their porosity and improve their thermal conductivity.

SUMMARY OF THE INVENTION

This invention provides a process which comprises treating a substrate surface with an alkali metal sulfide, and thereafter contacting the thus-treated surface with a solution of a metal salt. In one aspect of the invention, the resultant surface is electroplated to deposit an adherent metal coating on the substrate surface. In still a further aspect of the invention, the alkali metal sulfide-treated substrate surface can be directly subjected to an electroplating process, wherein the metal salt solution serves to provide a conductive surface which is then electroplated in the conventional manner. The instant invention also provides articles having treated surfaces resulting from the above-described processes.

DESCRIPTION OF THE PREFERRED EMBODIMENTS

The process of the invention is applicable to various substrates which have a coarse, rough, irregular or porous surface or a surface that can be rendered coarse, rough, irregular or porous by chemical or mechanical methods. Suitable substrates include, but are not limited to, polymers such as phenolic resins, and synthetic rubber; polymeric articles such as poly(haloethylene) string; as well as unglazed porcelain, cork, wood, leather, and cotton fibers and cloth.

Polymers to which the process of this invention are particularly applicable are those polymers containing an aromatic hydrocarbon nuclei. Especially preferred are the phenol-aldehyde resins that are commonly known in the art. Such phenol-aldehyde resins can be produced from phenol itself or the various phenols that are substituted, for example, with hydroxyl groups or with halogen atoms such as fluorine, chlorine or bromine, or with hydrocarbyl radicals, such as alkyl and alkenyl groups of 1 to 18 carbon atoms, alicyclic groups of 5 to 18 carbon atoms and aryl or aralkyl groups of 6 to 18 carbon atoms. Suitable substituted phenols include the following: hydroquinone, resorcinol, catechol, para-tertiary-butylphenol, para-chlorophenol, para-tertiary hexylphenol, para-isooctylphenol, para-phenylphenol, para-benzylphenol, para-cyclohexylphenol, para-octadecyl-phenol, para-nonylphenol, para-beta-naphthyl-phenol, para-alpha-naphthyl-phenol, para-cetyl-phenol, para-cumyl-phenol, and the corresponding ortho- and meta-substituted phenols. In the preparation of the phenol-aldehyde resins, the phenol should have at least two of the three ortho and para positions unsubstituted.

The phenol-aldehyde resins are preferably prepared from formaldehyde, which can be an aqueous solution or any of its low polymeric forms such as paraform or trioxane. The aldehydes preferably contain 1 to 8 carbon atoms. Suitable examples include: acetaldehyde, propionaldehyde, butyraldehyde, benzaldehyde, furfural, 2-ethylhexanol, ethylbutyraldehyde, heptaldehyde, pentaerythrose, glyoxal and chloral.

The preferred phenol-aldehyde resins are the novolac resins which are produced using a ratio of about 0.5 to about 0.9 mole of aldehyde per mole of phenol. These resins are readily cured with a methylene compound, such as hexamethylene tetramine. However, the resoles can also be employed, which are produced using a ratio of at least one mole of aldehyde per mole of the phenol.

The polymers of the invention can be used in the unfilled condition, or with fillers such as glass fiber, glass powder, glass beads, asbestos, talc and other mineral fillers, woodflour and other vegetable fillers, carbon in its various forms, dyes, pigments, and the like.

The polymers of the invention can be in various physical forms, such as shaped articles, for example, moldings, sheets, rods, and the like; fibers, films and fabrics, and the like.

In the first step of the process of the invention, the substrate surface is treated with an alkali metal sulfide, preferably in the form of an aqueous solution. As used in this specification and claims, the exxpression "alkali metal sulfide" shall include the alkali metal monosulfides, the alkali metal polysulfides, the alkali metal sulfhydrates, and aqueous solutions of sulfur in alkali metal hydroxides. The preferred alkali metal in the foregoing compounds is sodium, but potassium, lithium and cesium can also be used. The solution concentration of the alkali metal sulfides is generally in the range of about 1 weight percent of the alkali metal sulfide (dry basis) based on the weight of the total solution, up to a saturated solution, preferably in the range of about 5 to 30 weight percent. The pH of the alkali metal sulfide solutions is generally in the range of 7 to 14, preferably in the range of 10 to 14. The pH of the solution can be adjusted by the addition of alkaline substances, such as the alkali metal hydroxides, for example, the hydroxides of sodium, potassium, lithium and cesium.

The substrate surfaces need not be subjected to a special cleaning step prior to treatment with the alkali metal sulfide solution. Thus, it is not necessary to subject the surfaces of materials such as plastics to special treatments required in other metal plating processes, such as etching, polishing and the like. If desired, however, the surface can be washed with a solvent such as trichloroethylene. Also, the substrate surface can be pretreated by contacting the surface with an alkali metal hydroxide, such as those described hereinbefore. The treatment with the alkali metal sulfide solution is generally conducted at a temperature in the range of about 0 to 100 degrees centrigrade, preferably at a temperature in the range of about 20 to 70 degrees centrigrade. The contact time varies depending on the nature of the substrate surface, the particular alkali metal sulfide and equivalent materials, and the contact temperature, but is generally in the range of about one second to one hour or more, preferably in the range of about 1 to 10 minutes.

Following the first treatment step, the substrate surface can be rinsed with water to remove the alkaline solution, and then can be dried by merely exposing the surface to the atmosphere or to non-oxidizing atmospheres such as nitrogen, carbon dioxide, and the like or by drying the surface with radiant heaters or in a conventional oven. Drying times can vary considerably, for example from 1 second to 30 minutes or more, preferably 5 seconds to 10 minutes. The rinsing and drying steps are optional, although the rinsing step is preferred.

In the second treatment step of the process of the invention, the alkali metal sulfide-treated substrate surface is contacted with an aqueous solution of a metal salt. The metals generally employed are those of Groups I–B, II–B, VII–B and VIII of the periodic table. The preferred metals are nickel, cobalt, silver, cadmium, iron, zinc, mercury and manganese.

The metal salts that are used in the invention can contain a wide variety of anions. Suitable anions include the anions of mineral acids such as sulfate, chloride, bromide, iodine, fluoride, nitrate, phosphate, chlorate, perchlorate, borate, carbonate, and the like. Also useful are the anions of organic acids such as formate, acetate, citrate, butyrate, valerate, caproate, heptylate, caprylate, naphthenate, 2-ethyl caproate, cinnamate, stearate, oleate, palmitate, dimethylglyoxime, and the like. Generally the anions of organic acids contain 1 to 18 carbon atoms.

Some useful metal salts include nickel sulfate, nickel chloride, nickel nitrate, nickel acetate, nickel formate, nickel citrate, cobalt chloride, silver nitrate, iron sulfate, zinc sulfate, mercury bromide, sodium sulfate, manganese chloride, and the like.

The foregoing metal salts are used in ionic media, preferably in aqueous solutions. However, mixtures of alcohol and water can be employed. Suitable alcohols include, for example, methyl alcohol, ethyl alcohol, butyl alcohol, heptyl alcohol, decyl alcohol and the like. The solution concentration is generally in the range from about 0.1 weight percent metal salt based on the total weight of the solution up to a saturated solution, preferably from about 1 to about 10 weight percent metal salt.

The step of contacting the alkali metal sulfide-treated substrate surface with the solution of metal salt is generally conducted at a temperature below the decomposition temperature of the substrate, or in the case of plastics, below the softening point of the plastic; and below the boiling point of the solution. Generally the temperature is in the range of about 0 to 100 degrees centigrade, preferably from about 20 to 90 degrees centigrade. The time of contact can vary considerably, depending upon the nature of the substrate surface, the characteristics of the metal salts employed and the contact temperature. However, the time of contact is generally in the range of about 0.1 to 30 minutes, preferably about 5 to 10 minutes.

The metal salt solution for the second step of the process of the invention can be supplied by the metal salt bath of a conventional electrolytic plating process. In these instances, it is possible to process the article with one less handling step and one less treating bath. However, it is generally desirable to retain the metal salt solution treating step as a separate step in the process so that the various steps in the overall process can be operated at their optimum efficiency and to provide the optimum reults. Regardless of whether the metal salt solution treatment step is carried out independently, the treated substrate surface resulting from the process of the invention is conductive so that an adherent metal plate can be deposited on the substrate surface by a conventional electrolytic plating process.

The treated substrate surfaces of the invention that are conductive can be electroplated by processes known in the art. The article to be plated is generally used as the cathode. The metal desired to be plated is generally dissolved in an aqueous plating bath, although other media can be employed. Generally, a soluble metal anode of the metal to be plated can be employed. In other instances, however, a carbon anode or other inert anode is used. Suitable metals, solutions and conditions for electroplating are described in Metal Finishing Guide Book Directory for 1967, published by Metals and Plastics Publications, Inc., Westwood, N.J.

The following examples serve to illustrate the invention but are not intended to limit it. Unless specified otherwise, all temperatures are in degrees centigrade and parts are understood to be expressed in parts by weight.

EXAMPLE 1

A treating solution was prepared by dissolving 200 parts by weight of hydrated sodium sulfide (about 62 weight percent $Na_2S$) in 400 parts by weight of water. An article molded from a phenol-formaldehyde novolac resin and cross-linked with hexamethylenetetramine was immersed in the sodium sulfide solution at 80 degrees centigrade for 6 minutes. Thereafter, the phenolic resin article was rinsed with water. The treated plastic article was then immersed in a nickel sulfate solution at 65 degrees centigrade for 5 minutes. The nickel sulfate solution had been prepared by dissolving 20 parts by weight of nickel sulfate heptahydrate in 200 parts by weight of water. The thus treated article was rinsed with water and then electroplated in a nickel plating bath at about 3 volts and 1 ampere until a good nickel plate had been deposited on the plastic surface. The nickel plating bath had been prepared by dissolving 149.8 parts by weight of nickel sulfate heptahydrate, 22.47 parts by weight of nickelous chloride hexahydrate and 14.98 parts by weight of boric acid, 500 parts by weight of water, followed by heating the solution to 55 degrees centigrade. In the electrolytic process, a nickel anode was employed, and the plastic article was employed as the cathode.

The plated article was aged 18 hours in air at room temperature. The article was placed in a circulating air oven maintained at 170° C. for two hours, then removed and allowed to cool to room temperature for one hour. The article was placed in a glass jar and immersed in a Dry Ice-acetone bath maintained at −30° to −40° C. for 20 hours. The above was repeated three additional times with no apparent failure of the plate.

EXAMPLES 2 TO 8

The method of Example 1 was repeated using various substrates as shown in Table 1. In each example, the article was successfully electroplated by the process of the invention.

TABLE I

| Example No.: | Substrate |
|---|---|
| 2 | Block of unglazed porcelain. |
| 3 | Cotton string. |
| 4 | Wooden tongue depressor. |
| 5 | Sheet of leather. |
| 6 | Rubber glove. |
| 7 | Poly(tetrafluoroethylene) string |
| 8 | Cork stopper. |

EXAMPLES 9 TO 20

Thse method of Example 1 was repeated using various metal salts instead of nickel sulfate, as shown in Table 2. In each example, the article was successfully electroplated by the process of the invention.

TABLE II

| Example No.: | Metal salt |
|---|---|
| 9 | Cadmium sulfate. |
| 10 | Ferrous sulfate. |
| 11 | Nickel citrate. |
| 12 | Cobalt chloride. |
| 13 | Nickel chloride. |
| 14 | Nickel nitrate. |
| 15 | Nickel acetate. |
| 16 | Nickel formate. |
| 17 | Manganese chloride. |
| 18 | Mercuric bromide. |
| 19 | Zinc sulfate. |
| 20 | Silver nitrate. |

EXAMPLE 21

A bottle cap, molded from a one-stage, thermosetting, phenol-formaldehyde resole resin, was contacted for 5 minutes at about 75° C. in a solution of 184.2 parts of hydrated sodium sulfhydrate (70 percent NaHS), 80 parts of sodium hydroxide and 880.7 parts of water. The article was rinsed with water and then contacted for 3 minutes at 65° C. in a 35.3 weight percent, aqueous solution of nickel sulfate hexahydrate. The treated article was then electroplated using the nickel plating bath of Example 1 at 3 volts and 2 amperes. A uniform, adherent nickel plate was obtained.

EXAMPLE 22

A bottle cap, molded from a one-stage, thermosetting, phenol-formaldehyde resole resin, was contacted for 5 minutes at 75° C. in a 10 weight percent aqueous solution of sodium hydroxide. The article was then contacted for 5 minutes at about 75° C. with a 33.3 weight percent solution of hydrated sodium sulfhydrate (70 percent NaHS). The article was rinsed with water and then contacted for 3 minutes at about 65° C. with a 35.3 weight percent aqueous solution of nickel sulfate hexahydrate. The treated article was then electroplated using the nickel plating bath of Example 1 at 3 volts and 2 amperes. An adherent nickel plate was obtained.

EXAMPLE 23

A bottle cap, molded from a one-stage, thermosetting, phenol-formaldehyde resole resin, was contacted for 5 minutes at 75° C. in a 10 weight percent aqueous solution of sodium hydroxide, and thereafter for 18 minutes at 75° C. in a 40 weight percent aqueous solution of sodium tetrasulfide ($Na_2S_4$). The article was rinsed and then immersed in a 35.3 weight percent aqueous solution of nickel sulfate hexahydrate. The treated article was electroplated using the nickel plating bath of Example 1 at 3 volts and 2 amperes to provide a uniform nickel plate.

EXAMPLE 24

A molded plastic article of a phenol-formaldehyde one-stage condensation product was immersed in a solution of 150 parts of sulfur, 125 parts of sodium hydroxide, and 250 parts of water for 13 minutes at 70° C. The article was removed from the aqueous solution, washed with water, and immersed in a solution of 80 parts of nickel sulfate hexahydrate and 320 parts of water for 3 minutes at 70°.

The article was removed from the sulfate solution and electroplated with nickel using the procedure of Example 1 to produce an adherent nickel plate.

EXAMPLE 25

Example 24 was repeated except that an aqueous solution of sulfur and potassium hydroxide was employed. An adherent nickel plate was obtained on the plastic article.

EXAMPLE 26

An article molded from a phenol-formaldehyde novolac resin and cured with hexamethylene tetramine was contacted for 5 minutes at 75° C. with a 33.3 weight percent aqueous solution of sodium sulfide (62 weight percent $Na_2S$). The article was rinsed with water and then electroplated using the electroplating bath and procedure of Example 1 to produce a uniform adherent nickel plate.

Various changes and modifications can be made in the process and products of this invention without departing from the spirit and scope of the invention. The various embodiments of the invention disclosed herein serve to further illustrate the invention but are not intended to limit it.

I claim:

1. A process which consists essentially of contacting a substrate which has a surface that is coarse, rough, irregular or porous or that can be rendered so by chemical or mechanical methods, with an aqueous solution of an alkali metal sulfide, contacting the alkali metal sulfide-treated substrate with a solution consisting essentially of a metal salt to produce a conductive coating on the substrate, and thereafter electroplating the thus-treated substrate to deposit an adherent metal coating on the treated substrate, wherein the metal of said metal salt is selected from Groups I–B, II–B, VII–B and VIII of the Periodic Table.

2. The process according to claim 1 wherein the alkali metal sulfide is sodium sulfide.

3. The process of claim 2 wherein the metal salt is nickel sulfate.

4. The process of claim 2 wherein the metal salt is nickel chloride.

5. The process of claim 2 wherein the metal salt is nickel acetate.

6. The process of claim 2 wherein the metal salt is silver nitrate.

7. The process of claim 2 wherein the metal salt is zinc sulfate.

8. The process according to claim 1 wherein the alkali metal sulfide is sodium sulfhydrate.

9. The process according to claim 1 wherein the alkali metal sulfide is sodium polysulfide.

10. The process according to claim 1 wherein the alkali metal sulfide is an aqueous solution of sulfur and sodium hydroxide.

11. An article comprising a substrate which has a surface that is coarse, rough, irregular or porous or that can be rendered so by chemical or mechanical methods, and a conductive coating on said substrate produced by a process consisting essentially of first contacting said substrate with an aqueous solution of an alkali metal sulfide, then contacting the resulting treated substrate with an aqueous solution consisting essentially of a metal salt, and thereafter electroplating the thus-treated substrate to deposit an adherent coating on the treated surface of the article, wherein the metal of said metal salt is selected from Groups I–B, II–B, VII–B and VIII of the Periodic Table.

12. The article of claim 11 wherein the substrate is a phenolformaldehyde novolac resin.

13. The article of claim 11 wherein the substrate is a phenolformaldehyde resole resin.

14. The article of claim 11 wherein the substrate is unglazed porcelain.

15. The article of claim 11 wherein the substrate is wood.

16. The article of claim 11 wherein the substrate is cotton.

References Cited

UNITED STATES PATENTS

| | | | |
|---|---|---|---|
| 2,079,690 | 5/1937 | Grisdale | 117—201 |
| 2,447,380 | 8/1948 | Wenger | 204—30 X |
| 2,474,502 | 6/1949 | Suchy | 204—21 |
| 2,917,439 | 12/1959 | Liu | 204—22 |
| 3,179,575 | 4/1965 | Dippel et al. | 204—38.2 |
| 3,294,654 | 12/1966 | Norman | 204—30 X |
| 3,309,215 | 3/1967 | Brader et al. | |
| 3,058,845 | 10/1962 | Hendricks | 117—160 X |
| 3,235,473 | 2/1966 | Le Duc. | |
| 3,326,719 | 6/1967 | Beltzer et al. | 117—160 X |
| 3,351,487 | 11/1967 | Levine et al. | 117—160 X |

OTHER REFERENCES

Wein, Samuel: Metallizing Non-Conductors, published by Metal Industry Publishing Co., 11 W. 42nd St., N.Y., copyright 1945 (only 12, 13, 37, 38 relied upon).

ALLEN B. CURTIS, Primary Examiner

U.S. Cl. X.R.

117—160, 201